United States Patent
Yang et al.

(10) Patent No.: US 11,262,876 B2
(45) Date of Patent: Mar. 1, 2022

(54) ELECTRONIC DEVICE, TOUCH DETECTION CIRCUIT AND UPDATE METHOD FOR REFERENCE VALUE OF TOUCH SCREEN

(71) Applicant: SHENZHEN GOODIX TECHNOLOGY CO., LTD., Guangdong (CN)

(72) Inventors: Wei Yang, Guangdong (CN); Wingho Pang, Guangdong (CN); Songsong Liu, Guangdong (CN); Haikuan Jiang, Guangdong (CN)

(73) Assignee: Shenzhen Goodix Technology Co., Ltd., Shenzhen (CN)

( * ) Notice: Subject to any disclaimer, the term of this patent is extended or adjusted under 35 U.S.C. 154(b) by 0 days.

(21) Appl. No.: 16/122,332

(22) Filed: Sep. 5, 2018

(65) Prior Publication Data
US 2019/0018543 A1  Jan. 17, 2019

Related U.S. Application Data

(63) Continuation of application No. PCT/CN2017/091725, filed on Jul. 4, 2017.

(51) Int. Cl.
*G06F 3/041* (2006.01)
*G06F 3/044* (2006.01)
*G01K 13/00* (2021.01)

(52) U.S. Cl.
CPC .......... *G06F 3/0443* (2019.05); *G01K 13/00* (2013.01); *G06F 3/0418* (2013.01); *G06F 3/0446* (2019.05)

(58) Field of Classification Search
None
See application file for complete search history.

(56) References Cited

U.S. PATENT DOCUMENTS

2009/0267922 A1* 10/2009 Umeda ................ H03K 17/962
345/178
2012/0113047 A1* 5/2012 Hanauer ........... G06F 3/041662
345/174

(Continued)

FOREIGN PATENT DOCUMENTS

CN       101526872 A     9/2009
CN       101566901 A     10/2009

(Continued)

OTHER PUBLICATIONS

Extended European Search Report for European Application No. 17898337.5 dated May 15, 2019.

(Continued)

*Primary Examiner* — Benjamin C Lee
*Assistant Examiner* — Emily J Frank
(74) *Attorney, Agent, or Firm* — Heslin Rothenberg Farley & Mesiti PC

(57) ABSTRACT

An electronic device, a touch detection circuit and an update method for a reference value of a touch screen are provided. The update method includes: acquiring a temperature value of an environment of the touch screen; when determining that the acquired temperature value is less than a preset temperature threshold and determining that a continuously touched area exists in the touch screen, collecting N data frames of the continuously touched area; calculating N feature values of the N data frames; and updating N reference values corresponding to the N data frames according to the N feature values; wherein, N is greater than 1 and N is an integer. A difference between a reference value and a sensed value of the continuously touched area may not be decreased with a temperature rise due to the heat transferred by a touched object, thus point elimination at a low temperature is avoided.

17 Claims, 11 Drawing Sheets

(56) References Cited

U.S. PATENT DOCUMENTS

| | | | | |
|---|---|---|---|---|
| 2012/0313767 | A1* | 12/2012 | Sitarski | B60K 35/00 340/425.5 |
| 2013/0265278 | A1* | 10/2013 | Son | G06F 3/0446 345/174 |
| 2013/0328790 | A1* | 12/2013 | Liu | G06F 3/04186 345/173 |
| 2014/0071085 | A1* | 3/2014 | Kasamatsu | G06F 3/041 345/174 |
| 2015/0002459 | A1* | 1/2015 | Watanabe | G06F 3/04186 345/174 |
| 2015/0241370 | A1* | 8/2015 | Mueller | G01K 1/20 345/173 |
| 2015/0309610 | A1* | 10/2015 | Rabii | G06F 3/0416 345/174 |
| 2016/0170526 | A1* | 6/2016 | Lee | G06F 3/04166 345/174 |
| 2020/0371662 | A1* | 11/2020 | Shi | G06F 3/0418 |

FOREIGN PATENT DOCUMENTS

| | | |
|---|---|---|
| CN | 102736775 A | 10/2012 |
| CN | 102929419 A | 2/2013 |
| CN | 103365515 A | 10/2013 |
| CN | 103577012 A | 2/2014 |
| CN | 103677452 A | 3/2014 |
| CN | 203562090 U | 4/2014 |
| CN | 105373253 A | 3/2016 |
| CN | 105549701 A | 5/2016 |
| CN | 106059555 A | 10/2016 |
| CN | 106293278 A | 1/2017 |
| CN | 106527783 A | 3/2017 |
| EP | 2112763 A1 | 10/2009 |
| EP | 2790092 A2 | 10/2014 |
| WO | 2015167810 A1 | 11/2015 |

OTHER PUBLICATIONS

International Search Report for PCT/CN2017/091725 dated Jul. 4, 2017.
Communication pursuant to Article 94(3) EPC for European Patent Application No. 17898337.5 dated Apr. 13, 2021.
Shenzhen Goodix Technology Co., Ltd., CN First Office Action, CN 201780000621.1, dated Jul. 23, 2021, 10 pgs.

* cited by examiner

| 5 | 11 | 16 | 4 | 3 |
|---|----|----|---|---|
| 2 | 29 | 106 | 41 | 4 |
| -11 | 100 | 165 | 132 | 8 |
| -3 | 36 | 123 | 52 | 6 |
| 3 | 9 | -2 | 1 | 6 |

FIG. 7

ELECTRONIC DEVICE, TOUCH DETECTION CIRCUIT AND UPDATE METHOD FOR REFERENCE VALUE OF TOUCH SCREEN

CROSS-REFERENCE TO RELATED TO APPLICATIONS

The present disclosure is a continuation of international application number PCT/CN2017/091725, filed on Jul. 4, 2017, which is hereby incorporated by reference herein in its entirety.

TECHNICAL FIELD

The present application relates to the field of touch screen technologies, and more particularly, to an electronic device, a touch detection circuit and an update method for a reference value of a touch screen.

BACKGROUND

At present, most of the electronic terminal devices on the market (for example, mobile phones, tablet personal computers, etc.) realize the human-computer interaction using a capacitive touch screen. The capacitive touch screen detects a user's touch operation through a capacitive sensor. Before detecting the user's operation on the touch screen, the touch screen generally establishes a reference original value, and the original value is obtained through code sampling of a touch control chip. The reference original value reflects an initial state of each sensing node of the capacitive sensor. When a touch object (for example, a finger, a stylus, or any other objects that can change the sensing capacitance), is conducted a clicking, a scribing, or other operation on the touch screen, the capacitance of a sensing node at a corresponding position will be changed. The original value obtained at this time is the current original value, and a difference can be obtained by subtracting the current original value from the reference original value. The difference can reflect the capacitance variation caused by the touch object at the operating position, and touch coordinates can be calculated and reported according to the difference.

In the course of realizing the present application, the inventor has found that at least the following problems exist in the prior art: when the temperature rises or drops, the original value of the capacitive touch screen will also change accordingly due to the temperature drift characteristics of the capacitive sensor; when the capacitive touch screen is used in a severe cold environment, and the user's finger is continuously placed in a certain position of the touch screen, the touch coordinates are normally reported at the beginning, but then a phenomenon of point elimination occurs; wherein the phenomenon of point elimination refers to operating the touch object on the touch screen while the touch control chip does not report the coordinates. The reason why the phenomenon of point elimination appears is that: when the user just puts the finger on the touch screen, the original value of the capacitive sensing node where the finger is located will decrease, and a positive difference can be obtained by subtracting the current original value from the reference original value; when the difference exceeds a certain threshold, the touch control chip will calculate and report the coordinates; however, in a severe cold environment, the temperature of the touch screen is far lower than that of the human finger, and when the finger is continuously placed in the same position of the touch screen, the temperature of the position will gradually be increased due to the heat conducted by the finger, which will cause the original value of the capacitive sensing node at the position to be gradually increased, so that the difference is gradually decreased; and when the difference is less than a certain threshold, the phenomenon of point elimination will occur to the position touched by the finger.

SUMMARY

Some embodiments of the present application aim to provide an electronic device, a touch detection circuit and an update method for a reference value of a touch screen, which can make a difference between a reference value and a sensed value of a continuously touched area not decrease with a temperature rise due to the heat transferred by the touch object, so that the appearance of the phenomenon of point elimination at a low temperature is avoided.

An embodiment of the present application provides an update method for a reference value of a touch screen, which includes: acquiring a temperature value of an environment where the touch screen is located; when determining that the acquired temperature value is less than a preset temperature threshold and determining that a continuously touched area exists in the touch screen, collecting N data frames of the continuously touched area; calculating N feature values of the N data frames; and updating N reference values corresponding to the N data frames according to the N feature values; wherein, N is greater than 1 and N is an integer.

An embodiment of the present application further provides a touch detection circuit, which includes a processor and a memory, wherein the processor is connected to a memory and a touch screen; the processor is configured to acquire a temperature value of an environment where the touch screen is located; the processor is further configured to, when determining that the acquired temperature value is less than a preset temperature threshold and determining that a continuously touched area exists in the touch screen, collect N data frames of the continuously touched area through the touch screen; and the processor is further configured to calculate N feature values of the N data frames, and update N reference values corresponding to the N data frames according to the N feature values; wherein, N is greater than 1 and N is an integer.

An embodiment of the present application further provides an electronic device, including the above-mentioned touch detection circuit.

An embodiment of the present application further provides an electronic device applied to the update method for a reference value of a touch screen above. The electronic device includes: a temperature sensor, a touch screen and a touch chip. The touch chip is connected to the temperature sensor and the touch screen; the temperature sensor is configured to acquire a temperature value of an environment where the touch screen is located; and the touch chip is configured to, when determining that the acquired temperature value of the environment where the touch screen is located is less than a preset temperature threshold and determining that a continuously touched exists in the touch screen, collect N data frames of the continuously touched area through the touch screen; and the touch chip is further configured to calculate N feature values of the N data frames, and update N reference values corresponding to the N data frames according to the N feature values; wherein, N is greater than 1 and N is an integer.

Comparing the embodiments of the present application with the prior art, when the acquired temperature value of the environment where the touch screen is located is less than the preset temperature threshold, the N data frames of the continuously touched area are collected and the N feature values of the N data frames are used to update the corresponding N reference values thereof, so that the reference value of the continuously touched area changes with the changing of the environmental temperature. Therefore, the difference between the reference value and the sensed value of the continuously touched area is not decreased with a temperature rise due to the heat transferred by the touch object, and the appearance of the phenomenon of point elimination at a low temperature is avoided.

In addition, the determining that a continuously touched area exists in the touch screen specifically includes: when a touch operation is detected, collecting M data frames of the touch screen; wherein, the M data frames are collected before the N data frames; identifying sensing nodes in a touch state in each of the data frames according to sensing values of sensing nodes in each of the M data frames; determining whether the sensing nodes in a touch state in two adjacent data frames of the M data frames are matched; when a determination result is that the sensing nodes are matched, determining that a continuously touched area exists; and selecting a data frame from the M data frames, and setting an area formed by the sensing nodes in a touch state in the selected data frame as the continuously touched area. The embodiment provides a specific method for determining that a continuously touched area exists in the touch screen.

In addition, after setting an area formed by the sensing nodes in a touch state in the selected data frame as the continuously touched area, the method further includes: externally expanding the continuously touched area according to a preset rule. In the embodiment, after the continuously touched area is determined, the continuously touched area is externally expanded according to a preset rule, so that the touch area is increased, thereby errors caused by slightly changing a touched position of a touched object are avoided.

Moreover, in the updating the N reference values corresponding to the N data frames according to the N feature values, a calculation formula is:

$$\begin{cases} Ref(M+i) = Ref(M+i-1), (K \in \{1,2,3 \ldots\}, i \in \{1,2,3 \ldots\} \text{ and } i \neq K*N) \\ Ref(M+i) = Ref(M+K*(N-1)) + \alpha*(FeatureData(M+K*N) - FeatureData(M+K*(N-1))), i = K*N \end{cases}$$

wherein, Ref denotes a reference value, FeatureData denotes a feature value, and α denotes a reference-updated empirical coefficient. The embodiment provides a specific calculation formula for updating the corresponding reference value according to the feature value.

Moreover, in the updating N reference values corresponding to the N data frames according to the N feature values, the method specifically includes: performing smooth filtering on the N feature values corresponding to the N data frames respectively; and updating the N reference values corresponding to the N data frames according to the N feature values after smooth filtering. In the embodiment, the changes of the feature value caused by jitter are filtered, and the accuracy of updating the reference values is improved.

In addition, a calculation formula of the smoothing filtering is:

FeatureData[*](j+1)=β*FeatureData(j+1)+(1−β)FeatureData(j)

wherein, FeatureData denotes a feature value, β denotes a smooth filtering empirical coefficient, and j=M, M+1, M+2, . . . , M+N−1. The embodiment provides a calculation formula of the smoothing filtering for filtering out jitter.

In addition, the touch screen is applied to an electronic device. A manner for acquiring the temperature value of an environment where the touch screen is located particularly includes: acquiring the temperature value by a temperature sensor disposed in the electronic device. The embodiment provides a specific manner for acquiring the temperature value of the environment where the touch screen is located.

Moreover, a manner for acquiring the temperature value of the environment where the touch screen is located particularly includes: acquiring original detection data collected in an untouched state in the environment where the touch screen is located; calculating a feature value of the environment where the touch screen is located according to the original detection data; and acquiring a temperature value corresponding to the feature value according to a preset correspondence between the feature value and the temperature value. The embodiment provides another specific manner for acquiring a temperature value, which can acquire the temperature value without using a temperature sensor, requires less hardware, and has low requirements on the hardware configuration of the electronic device, so that the embodiment can be applied to more electronic devices.

In addition, a value of M is 9.

In addition, the calculating N feature values of the N data frames includes: calculating average or median of the sensed values of each sensing node in the N data frames as the N feature values. The embodiment provides a specific calculation manner of the feature value, and that taking the average or median of the sensed values of each sensing node as the feature values has preferable stability.

BRIEF DESCRIPTION OF THE DRAWINGS

One or more embodiments are illustrated by way of example through the figures in the corresponding accompanying drawings, which are not intended to limit the embodiments, and elements having the same reference numerals in the accompanying drawings are illustrated as similar elements. Unless otherwise stated, the figures in the accompanying drawings do not constitute a limitation of ratio.

FIG. 7 is a data plot showing a difference between a partial reference value and a sensed value of a touch screen according to the third embodiment of the present application;

DETAILED DESCRIPTION

To make the objectives, technical solutions, and advantages of the application clearer, the following further describes some embodiments of the application in detail with reference to the accompanying drawings and embodiments. It is understood that the specific embodiments described herein are merely illustrative of the application and are not intended to limit the application.

Figure 1:
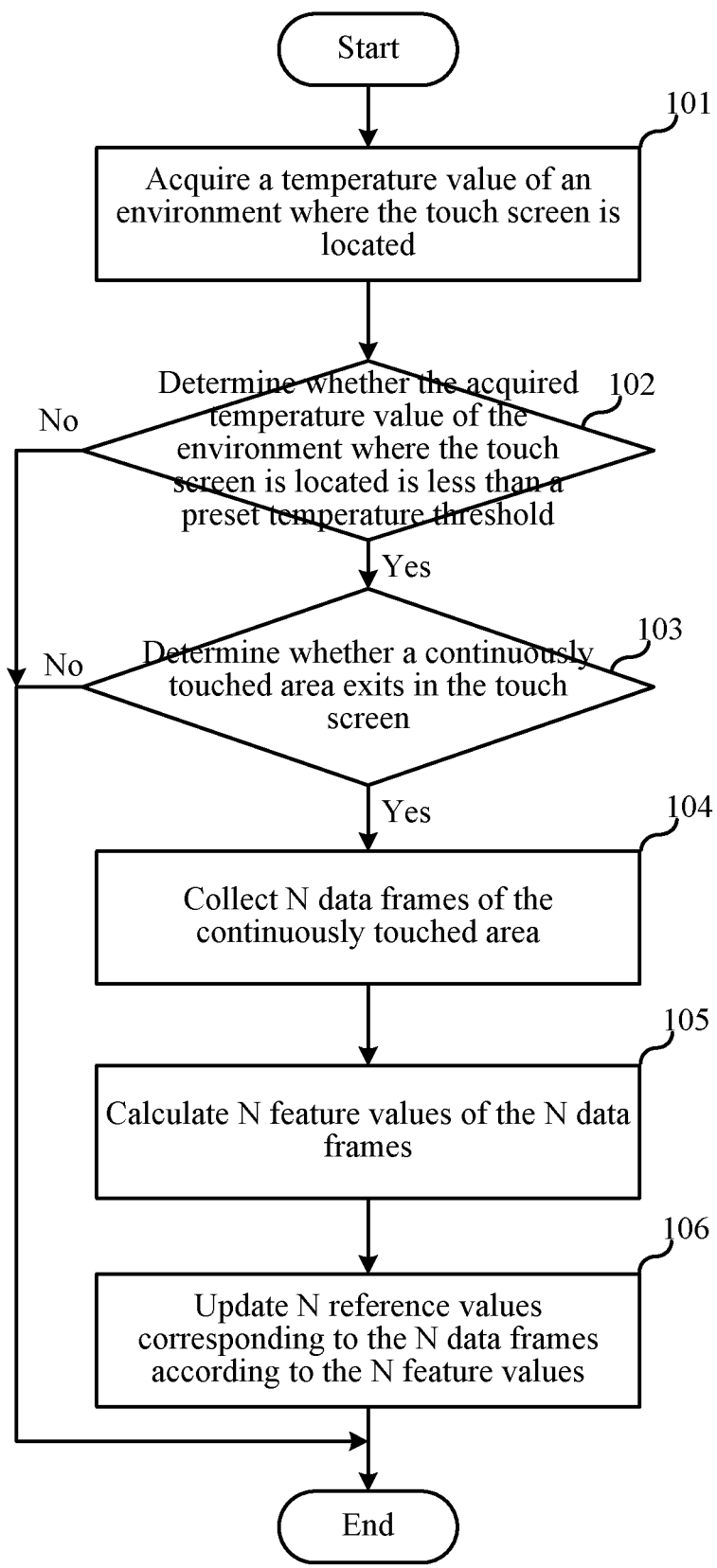
FIG. 1 is a specific flow chart of an update method for a reference value of a touch screen according to a first embodiment of the present application.

A first embodiment of the present application relates to an update method for a reference value of a touch screen applied to an electronic device. The electronic device, such as a mobile phone, a tablet personal computer or the like, at least includes a temperature sensor, a touch screen, and a touch chip. A specific flow of the update method for a reference value of a touch screen is as shown in FIG. 1.

In step 101, a temperature value of an environment where the touch screen is located is acquired.

Specifically, a temperature sensor is disposed in the electronic device, and the temperature value of the environment in which the touch screen is located is acquired by the temperature sensor, which is not limited thereto.

In step 102, determining whether the acquired temperature value of the environment in which the touch screen is located is less than a preset temperature threshold. If yes, step 103 is performed; if not, the process is ended directly.

Specifically, the temperature threshold can be acquired according to a low temperature environment experiment. In the experiment, an environmental temperature is preset, a finger or other touch object is pressed against the touch screen, and the temperature of the touch screen will be gradually increased. Observe whether the phenomenon of point elimination occurs, and constantly adjust the environmental temperature. The maximum temperature at which point elimination will occur may be set as the temperature threshold. In the embodiment, determine whether the temperature value of the environment is less than the temperature threshold via the touch chip. When determining that the environmental temperature value is less than the temperature threshold, then step 103 is performed; otherwise, it indicates that point elimination is not prone to occur to the touch screen at the temperature of the environment where the touch screen is located.

In step 103, whether a continuously touched area exits in the touch screen is determined. If yes, step 104 is performed; if not, the process is ended directly.

Specifically, only when a user continues to place a finger in the same position of the touch screen, the phenomenon of point elimination will occur due to the decreased difference caused by the temperature rise of the touch screen. The touch chip determines whether a continuously touched area exists in the touch screen, and only when determining that a continuous continuously touched area exists in the touch screen, step 104 is performed; otherwise, it means that the user does not continuously place the finger in the same position on the touch screen, and it is not prone to cause the phenomenon of point elimination.

In step 104, N data frames of the continuously touched area are collected.

Specifically, the touch chip collects the N data frames of the continuously touched area through the touch screen while the user continues to place the finger on the touch screen; wherein, N is greater than 1 and N is an integer.

In step 105, N feature values of the N data frames are calculated.

Specifically, the touch chip calculates the N feature values respectively according to the collected N data frames.

In the embodiment, the acquired average or median of the sensed values of each sensing node in the touch area of the touch screen is used as the feature values, but are not limited thereto, and the sensed value of a certain sensing node may also be used as the feature value; or the maximum or minimum values of the sensed values of all the sensing nodes in a certain touch area on the touch screen are used as the feature values; or the maximum or minimum values of the sensed values of all the sensing nodes on the entire touch screen are used as the feature values; wherein, taking the acquired average or median of the sensed values of each sensing node in the touch area of the touch screen as the feature values has preferable stability than that of the other ways.

In step 106, N reference values corresponding to the N data frames are updated according to the N feature values.

Specifically, the touch chip locally updates the reference value in the continuously touched area according to a change trend of the feature values of the continuously touched area. Please refer to FIG. 2, which is a graph showing changing of a difference between a reference value and a sensed value after the reference value is updated. It can be seen from the figure that the difference from the $9^{th}$ data frame remains at about 140 after the reference value is updated; the differential value of the feature values can be used to describe the change trend of the feature values, all the reference values in the range of the continuously touched area are added with the differential value, and a calculation formula for the updated reference value is:

$$\begin{cases} Ref(M+i) = Ref(M+i-1), (i \neq K*n) \\ Ref(M+i) = Ref(M+K*(n-1)) + \alpha*(FeatureData(M+K*n) - FeatureData(M+K*(n-1))), i = K*n \end{cases}$$

wherein, FeatureData(M+K*n)−FeatureData(M+K*(n−1)) denotes a differential value of a feature value, Ref denotes a reference value, FeatureData denotes the feature value, α denotes a reference-updated empirical coefficient, K∈ {1, 2, 3 . . . }, the value of K reflects a reference updating speed, and M denotes a number of data frames collected in the continuously touched area.

The formula is described using the following example, for instance, K is 2, M is 9, and n is 1, 2, 3, . . . , then i=K*n=2, 4, 6, . . . ;

Ref(M+i)=Ref(M+K*(n−1))+α*(FeatureData(M+K*n)−FeatureData(M+K*(n−1)))

it is equivalent to updating the reference values sequentially every two data frames, i.e., updating the reference values of odd data frames such as the 11$^{th}$ data frame, the 13$^{th}$ data frame, and the 15$^{th}$ data frame;

Ref(M+i)=Ref(M+i−1)

for example, ref (11)=ref (10), i.e., the reference value in the data frame in the interval is replaced and updated using the updated reference value, so as to completely update the reference values of the N data frames.

It should be noted that FIG. 1 merely describes the steps in an exemplary manner, and does not limit the actual execution sequences of step 101, step 102, and step 103. That is, in the example, step 103 may also be performed first to determine whether a continuously touched area exists in the touch screen, then step 101 and step 102 are performed to acquire the temperature value of the environment where the touch screen is located, and determine whether the acquired temperature value of the environment where the touch screen is located is less than the preset temperature threshold.

Comparing the embodiment with the prior art, when the acquired temperature value of the environment where the touch screen is located is less than the preset temperature threshold, the N data frames of the continuously touched area are collected and the N feature values of the N data frames are used to update the corresponding N reference values thereof, so that the reference value of the continuously touched area changes with the changing of the environmental temperature. Therefore, the difference between the reference value and the sensed value of the continuously touched area is not decreased with a temperature rise due to the heat transferred by the touched object, thus the phenomenon of point elimination at a low temperature is avoided.

A second embodiment of the present application relates to an update method for a reference value of a touch screen. The embodiment is substantially the same as the first embodiment, and the main differences lie in that: in the first embodiment, the temperature value of the environment where the touch screen is located is acquired by the temperature sensor in the electronic device; while the embodiment provides another manner for acquiring the temperature value of the environment where the touch screen is located.

Figure 3:
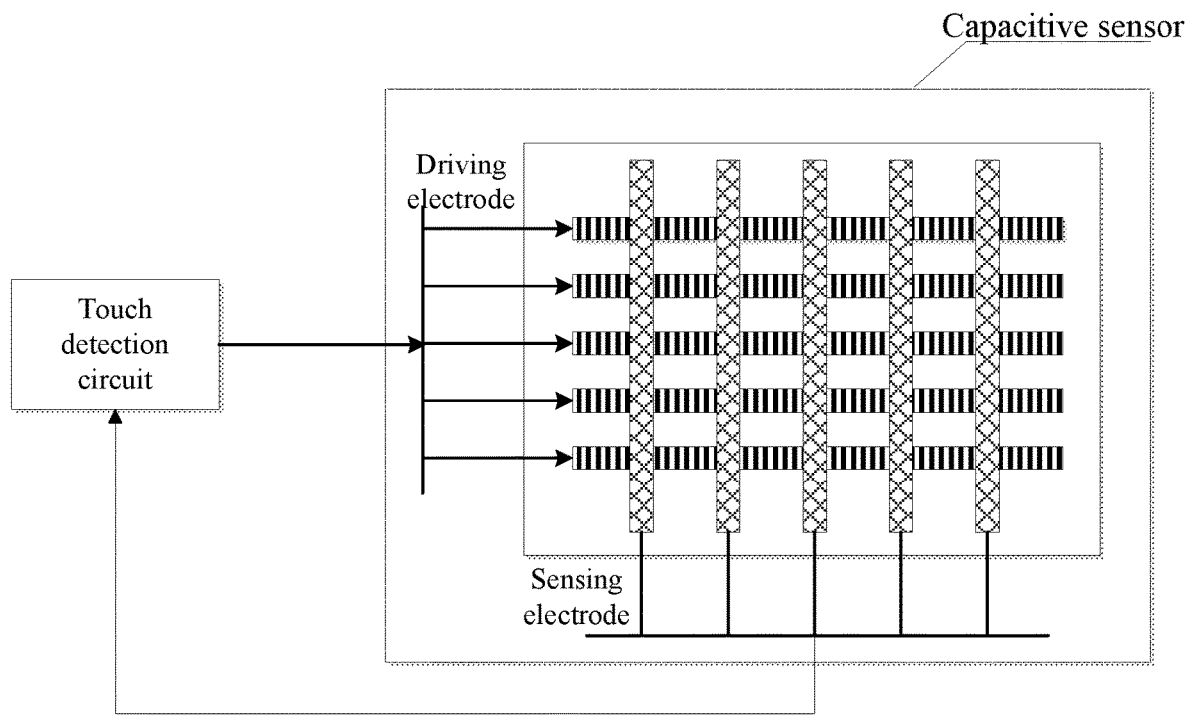
FIG. 3 is a specific flow chart of an update method for a reference value of a touch screen according to a second embodiment of the present application.

In the embodiment, referring to FIG. 3, a capacitive touch screen generally includes a touch panel and a touch detection circuit. The touch detection circuit includes a processor and a memory. The processor and the memory may be integrated in the same touch detection chip. However, the embodiment does not impose any restrictions on this. The touch panel is a capacitive sensor formed on a substrate. The capacitive sensor is generally composed of a driving electrode and a sensing electrode. In a typical mutual capacitance touch screen, a sensing node is formed on an intersected position of each sensing electrode and each sensing electrode. In FIG. 3, taking five driving electrodes and 5 sensing electrodes as an example, and 25 sensing nodes are formed.

Figure 4:
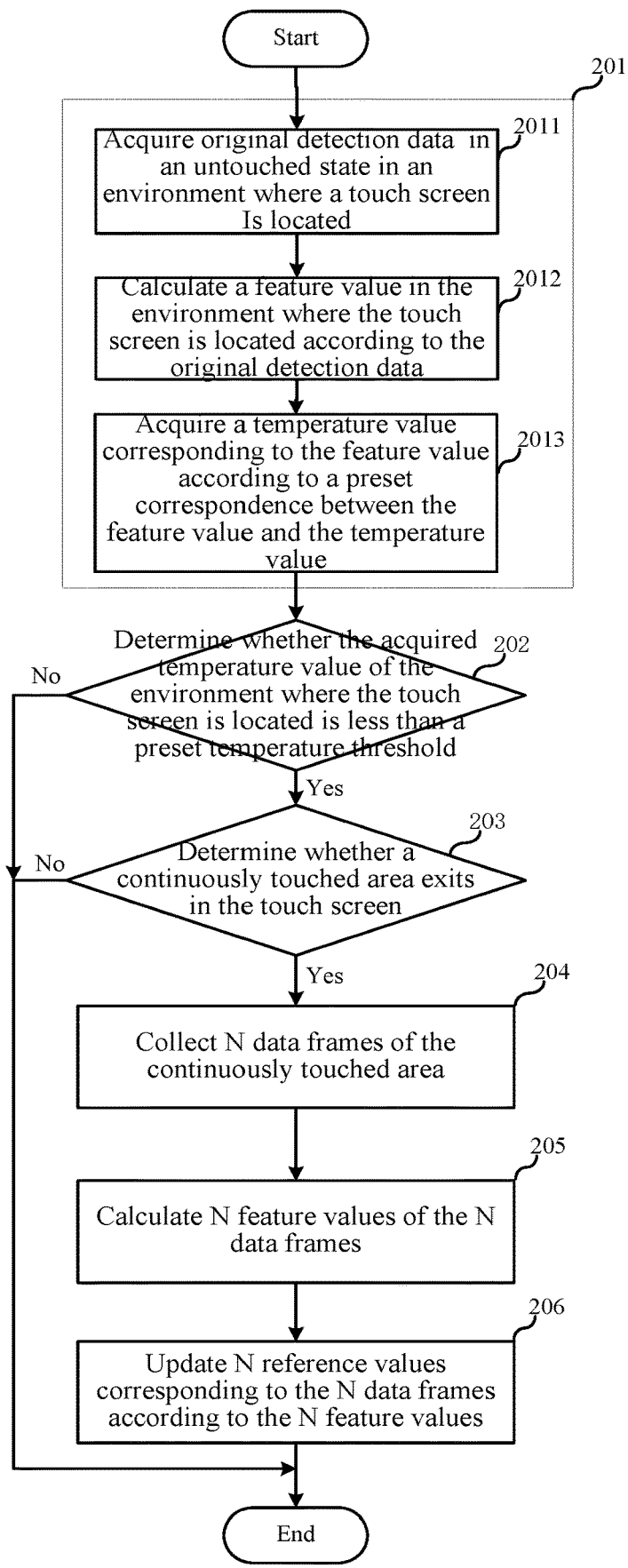
FIG. 4 is a schematic diagram of a capacitive touch screen according to the second embodiment of the present application.

The update method for a reference value of a touch screen in the embodiment is as shown in FIG. 4.

Wherein, step 202 to step 206 are substantially the same as step 102 to step 106, which will not be elaborated herein, and the main refinements lie in that: in the embodiment, the step 201 of acquiring the temperature value of the environment where the touch screen is located specifically includes the following sub-steps.

In sub-step 2011, original detection data in an untouched state in the environment where the touch screen is located is acquired.

Specifically, the capacitive touch screen acquires the original detection data under the current environment and in an untouched state through a capacitive sensor. Please refer to FIG. 3, the processor drives a coding signal of a certain frequency to enter the driving electrode according to a certain driving mode. After the coding signal passes through the capacitive sensor, the coding signal returns to the touch screen via the sensing electrode. After the internal ADC conversion and digital signal processing of the touch screen, the sensed value of each mutual capacitance sensing node can be acquired, wherein, the original detection data includes sensed value of each sensing node in at least part of the touch area of the touch screen, i.e., the original detection data may be the sensed values of all the sensing nodes in the entire touch screen, or the sensed values of all the sensing nodes included in a certain touch region touch area on the touch screen.

Table 1 below shows a frame of raw data acquired by sequential coding sampling of the touch control chip, and a capacitive touch screen having 6 driving electrodes and 16 sensing electrodes is taken as an example.

TABLE 1

| 5392 | 5385 | 5190 | 5210 | 5145 | 5205 | 5142 | 5218 |
| 5612 | 5572 | 5413 | 5398 | 5385 | 5386 | 5378 | 5393 |
| 5688 | 5628 | 5465 | 5444 | 5419 | 5437 | 5421 | 5451 |
| 4234 | 4180 | 4076 | 4058 | 4045 | 4052 | 4055 | 4068 |
| 5608 | 5545 | 5396 | 5378 | 5351 | 5366 | 5358 | 5380 |
| 5342 | 5260 | 5134 | 5103 | 5095 | 5103 | 5102 | 5132 |
| 5040 | 4880 | 4872 | 4938 | 4835 | 4749 | 4649 | 4639 |
| 5332 | 5053 | 5131 | 5114 | 5115 | 4927 | 4938 | 4824 |
| 5374 | 5112 | 5171 | 5172 | 5184 | 4989 | 4994 | 4894 |
| 4019 | 3811 | 3856 | 3855 | 3845 | 3718 | 3709 | 3651 |
| 5311 | 5049 | 5108 | 5108 | 5096 | 4934 | 4937 | 4843 |
| 5040 | 4801 | 4858 | 4854 | 4841 | 4681 | 4680 | 4606 |

In sub-step 2012, a feature value in the environment where the touch screen is located is calculated according to the original detection data.

Specifically, the processor calculates the feature value of the touch screen in the environment according to the acquired sensed value of each sensing node of the touch area of the touch screen; wherein the method for calculating the feature value is substantially the same as step 105, which will not be elaborated herein.

In sub-step 2013, a temperature value corresponding to the feature value is acquired according to a preset correspondence between the feature value and the temperature value.

Figure 5:
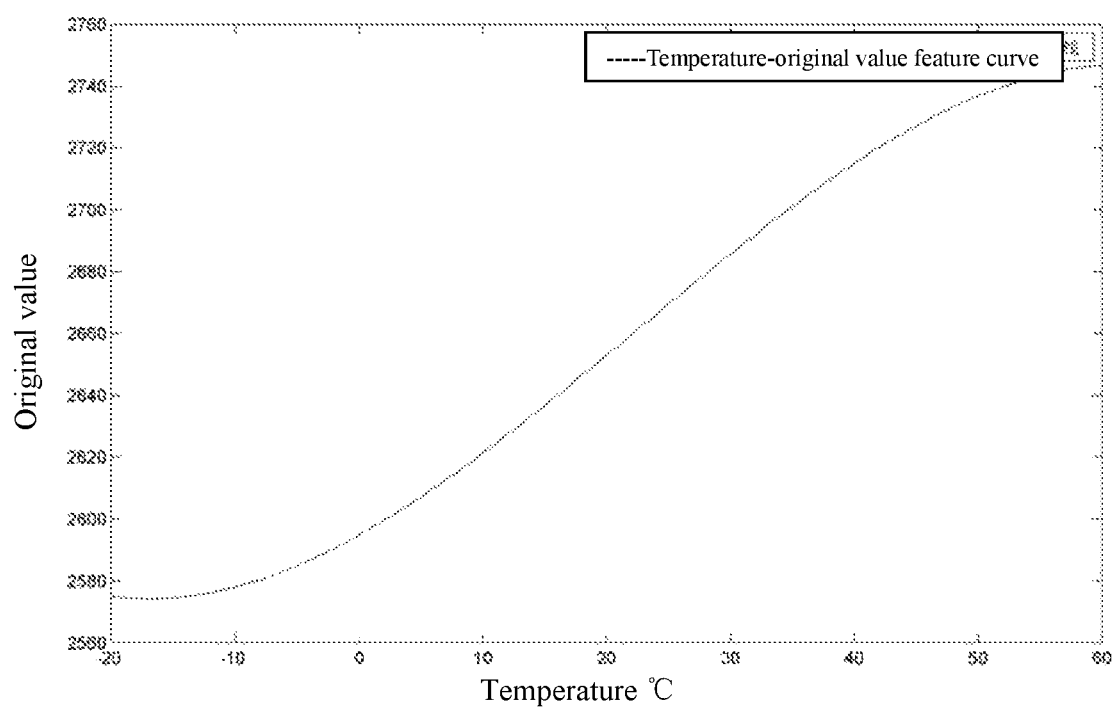
FIG. 5 is a graph showing temperature-original value feature according to the second embodiment of the present application.

Specifically, the processor can acquire the temperature value corresponding to the feature value according to the preset correspondence between the feature value and the temperature value. Wherein the correspondence between the feature value and the temperature value can be represented by a temperature-original value feature curve, but the embodiment does not impose any limitation thereon. FIG. 5 is a temperature-original value feature curve of a certain touch screen, and a functional relation y=f(x) between the temperature and the feature value can be obtained by means of curve fitting, wherein an independent variable x denotes temperature, a dependent variable y denotes thee feature value of the touch screen, and the temperature value of the environment where the touch screen is located can be calculated by substituting the feature value of the touch screen into the function.

Relative to the first embodiment, the embodiment provides another manner for acquiring a temperature value of the environment where the touch screen is located, which can acquire the temperature value without using a temperature sensor, requires less hardware, and has low requirements on the hardware configuration of the electronic device, so that the embodiment can be applied to more electronic devices.

A third embodiment of the present application relates to an update method for a reference value of a touch screen. The embodiment is a refinement to the first embodiment, and the main refinements lie in that: the step 103 of determining whether a continuously touched area exists in the touch screen is introduced in detail.

Figure 6:
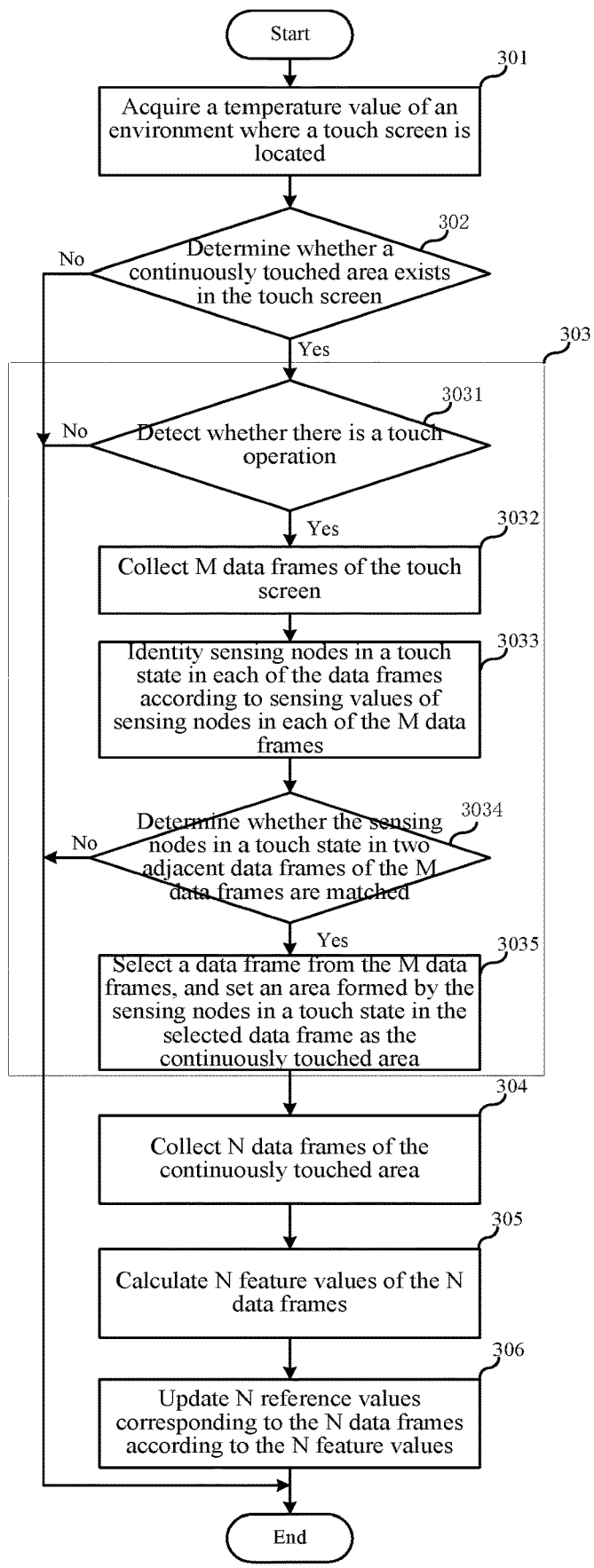
FIG. 6 is a specific flow chart of an update method for a reference value of a touch screen according to a third embodiment of the present application.

The update method for a reference value of a touch screen in the embodiment is as shown in FIG. 6.

Wherein step 301 and step 302 are substantially the same as step 101 and step 102, and step 304 to step 306 are substantially the same as step 104 to step 106, which will not be elaborated herein, and the main differences lie in that: in the embodiment, the step 303 of determining whether a continuously touched area exists in the touch screen specifically includes the following sub-steps.

In sub-step 3031, whether there is a touch operation is detected. If yes, sub-step 3032 is performed; if not, the process is ended directly.

Specifically, whether there is a touch operation is detected, i.e., whether a user is using an electronic device is detected. When determining that the user is using the electronic device, sub-step 3032 is performed; otherwise the process is directly ended.

In sub-step 3032, M data frames of the touch screen are collected.

Specifically, when determining that the user touches the touch screen of the electronic device with a finger, M data frames of the touch screen are acquired; wherein the M data frames of the touch screen are acquired before the N data frames, i.e., the M data frames collected first when the finger of the user is touching the touch screen, are used for determining whether a continuously touched area exists, and the subsequently acquired N data frames are used for updating the reference value; the value of M can be obtained by experimental observation in a low temperature environment. In the embodiment, the value of M is 9 (elaborated in detail hereinafter), but the embodiment does not impose any limitation.

In sub-step 3033, sensing nodes in a touch state in each of the data frames are identified according to sensing value of each sensing nodes in each of the M data frames.

Specifically, differences between the reference values and the sensed values of all the sensing nodes in each of the data frames are calculated according to the sensed value of each sensing node in each of the M data frames; then, each difference is compared with a threshold TouchLevel, and the sensing nodes with differences greater than the threshold TouchLevel are determined to be in a touch state, thereby the sensing nodes in a touch state in each of the data frames can be identified.

In sub-step 3034, the sensing nodes in a touch state in two adjacent data frames of the M data frames are determined whether to be matched; if yes, sub-step 3035 is performed; if not, the process is ended directly.

Specifically, in the collected M data frames, the differences between the reference values and the sensed values of the sensing nodes in a touch state in each of the data frames are calculated, and whether a touched object exists in the touch screen is determined and a location range of the touched object is calculated according to the differences. When the calculated location range in the two adjacent data frames contain a half or more of the same sensing nodes, then a determination result is that the sensing nodes are matched, it means that a continuously touched area exists, and sub-step 3035 is performed; otherwise, it means that no continuously touched area exists, and the phenomenon of point elimination at a low temperature will not occur, then the process is ended directly.

In sub-step 3035, a data frame is selected from the M data frames, and an area formed by the sensing nodes in a touch state in the selected data frame is set as the continuously touched area.

Figure 2:
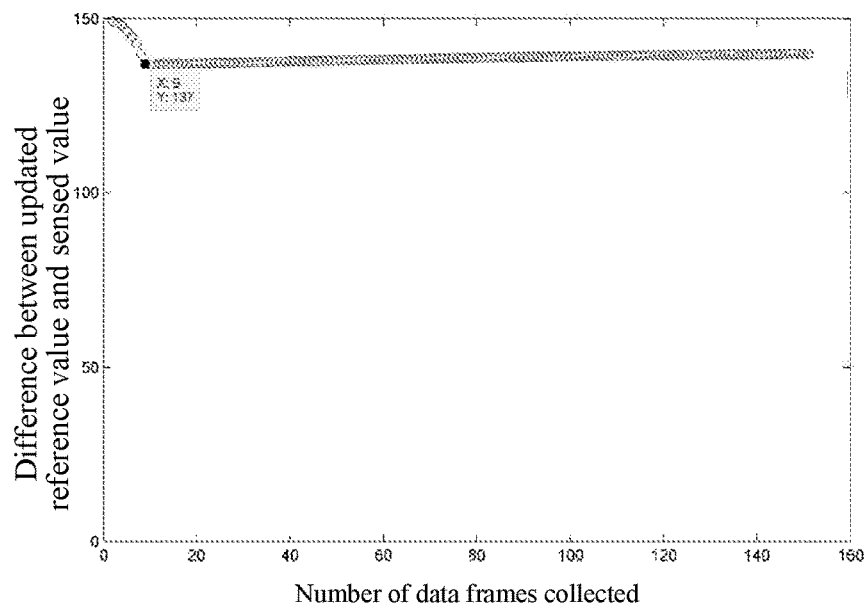
FIG. 2 is a graph showing changing of a difference between a reference value updated from a reference value and a sensed value according to the first embodiment of the present application.
Figure 8:
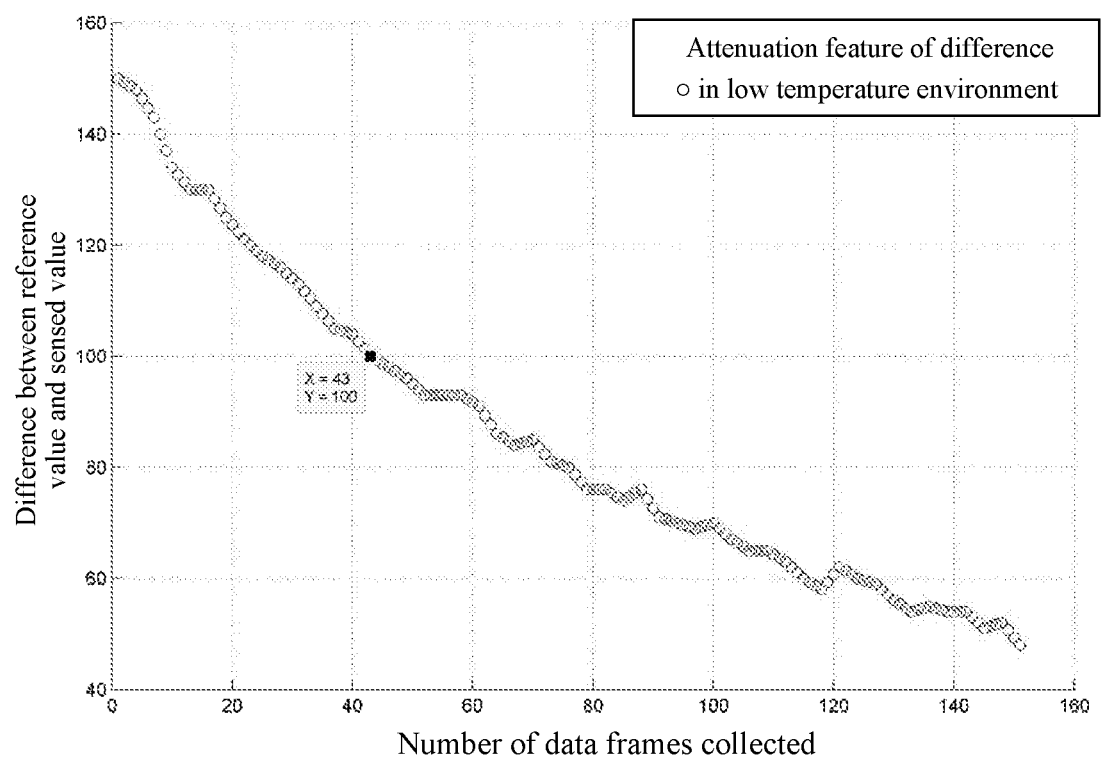
FIG. 8 is a trend graph showing attenuation of a difference between a reference value and a sensed value in a continuously touched area according to the third embodiment of the present application.

Specifically, a first data frame in the M data frames is selected to determine the continuously touched area in general. Please refer to FIG. 7, which shows partial difference data formed in the touch screen by a screen touched object in a certain data frame. Each square corresponds to the sensing node formed by the intersection of the driving electrode and the sensing electrode in FIG. 3, wherein the threshold TouchLevel=100, i.e., the point with a difference greater than 100 is a sensing node, and a dashed box area is an area formed by all the sensing nodes in the data frame, and this area is used as a continuously touched area. Please refer to FIG. 8, which is a trend graph showing attenuation of the difference in the continuously touched area after the finger is continuously placed in a certain position of the touch screen in a low temperature environment. It can be seen from the figure that when the difference is attenuated to the threshold TouchLevel (TouchLevel=100), 43 data frames are continuously collected. Therefore, the value of M is less than 43, i.e., the value of M is preferably selected between 0 and 43. As shown in FIG. 2, the difference after the reference value is updated from the $9^{th}$ data frame (i.e., M=9) is maintained at about 140 all the time, which is greater than the threshold TouchLevel=100, and the phenomenon of point elimination at a low temperature will not occur. Therefore, in the embodiment, a preferred value of M is 9.

In the embodiment, the value of the threshold TouchLevel is 100. However, the embodiment does not impose any limitation thereon, and the value can be set based on experience.

Relative to the first embodiment, the embodiment provides a specific method for determining whether a continuously touched area exists in the touch screen. It should be noted that the embodiment can also be used as a refinement to the second embodiment, which can achieve the same technical effects.

A fourth embodiment of the present application relates to an update method for a reference value of a touch screen. The embodiment is an improvement on the basis of the third embodiment, and the main improvements lie in that: in the embodiment, after the continuously touched area is determined, the continuously touched area is externally expanded according to a preset rule.

Figure 9:
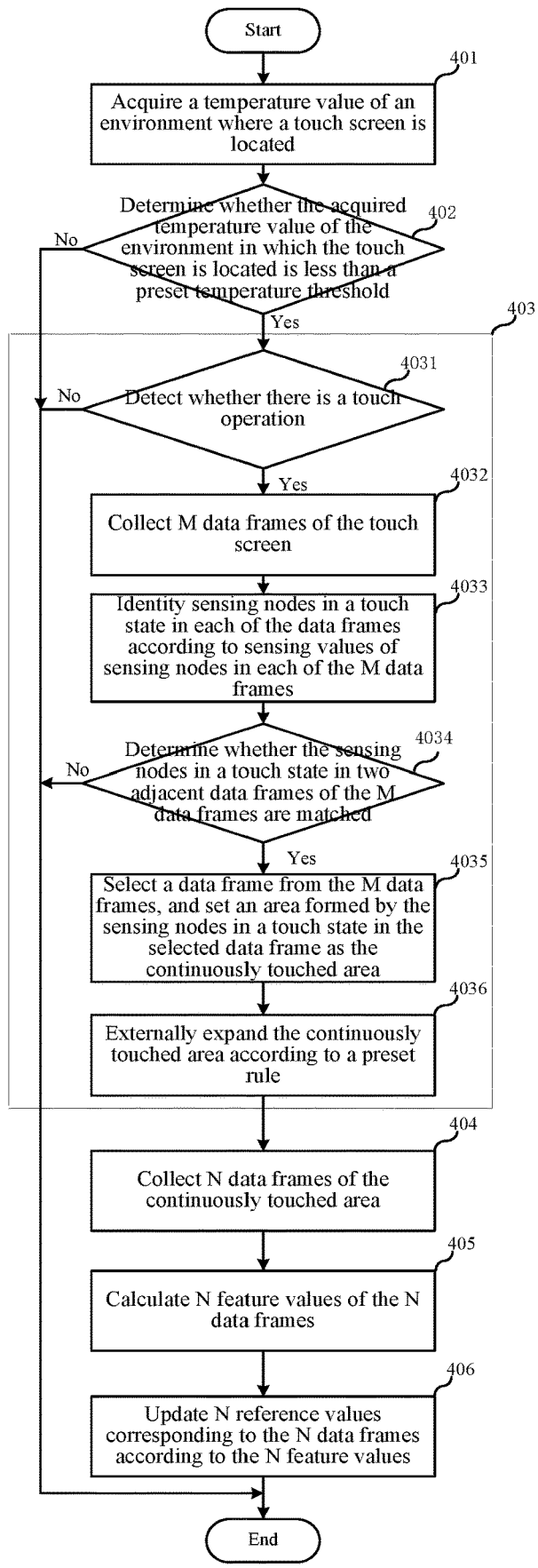
FIG. 9 is a specific flow chart of an update method for a reference value of a touch screen according to a fourth embodiment of the present application.

The update method for a reference value of a touch screen in the embodiment is as shown in FIG. 9.

Step 401 and step 402 are substantially the same as step 301 and step 302, step 404 to step 406 are substantially the same as step 304 to step 306, and sub-step 4031 to sub-step 4035 are substantially the same as sub-step 3031 to sub-step 3035, which will not be elaborated herein, and the main differences lie in that: in the embodiment, a sub-step 4036 is added, which is specifically as follows:

In sub-step 4036, the continuously touched area is externally expanded according to a preset rule.

Specifically, after the continuously touched area is determined, the continuously touched area is externally expanded according to a preset rule, for example, one sensing node is externally expanded based on the outermost sensing node in each direction in the continuously touched area, and a rectangular region formed by the intersection of lines where the externally expanded sensing nodes are located is used as a touch area. Please refer to FIG. 7, each square corresponds to the sensing node formed by the intersection of the driving electrode and the sensing electrode in FIG. 3 respectively. A dashed box represents the continuously touched area. In the four directions of the upper, the lower, the left and the right, the outermost sensing nodes are 106, 100, 123, and 132 respectively (the sensing nodes are represented by the differences). The externally expanded sensing nodes are 16, −11, −2, and 8. Therefore, after the sensing nodes are externally expanded, the entire rectangular frame in FIG. 7 is the externally expanded touch area.

Relative to the third embodiment, after the continuously touched area is determined in the embodiment, the continuously touched area is externally expanded according to a preset rule, so that the touch area is increased, thereby errors caused by slightly changing a touched position of a touched object is avoided.

A fifth embodiment of the present application relates to an update method for a reference value of a touch screen. The embodiment is a refinement to the first embodiment, and the main refinements lie in that: the step 106 of updating the N reference values corresponding to the N data frames according to the N feature values is introduced in detail.

Figure 10:
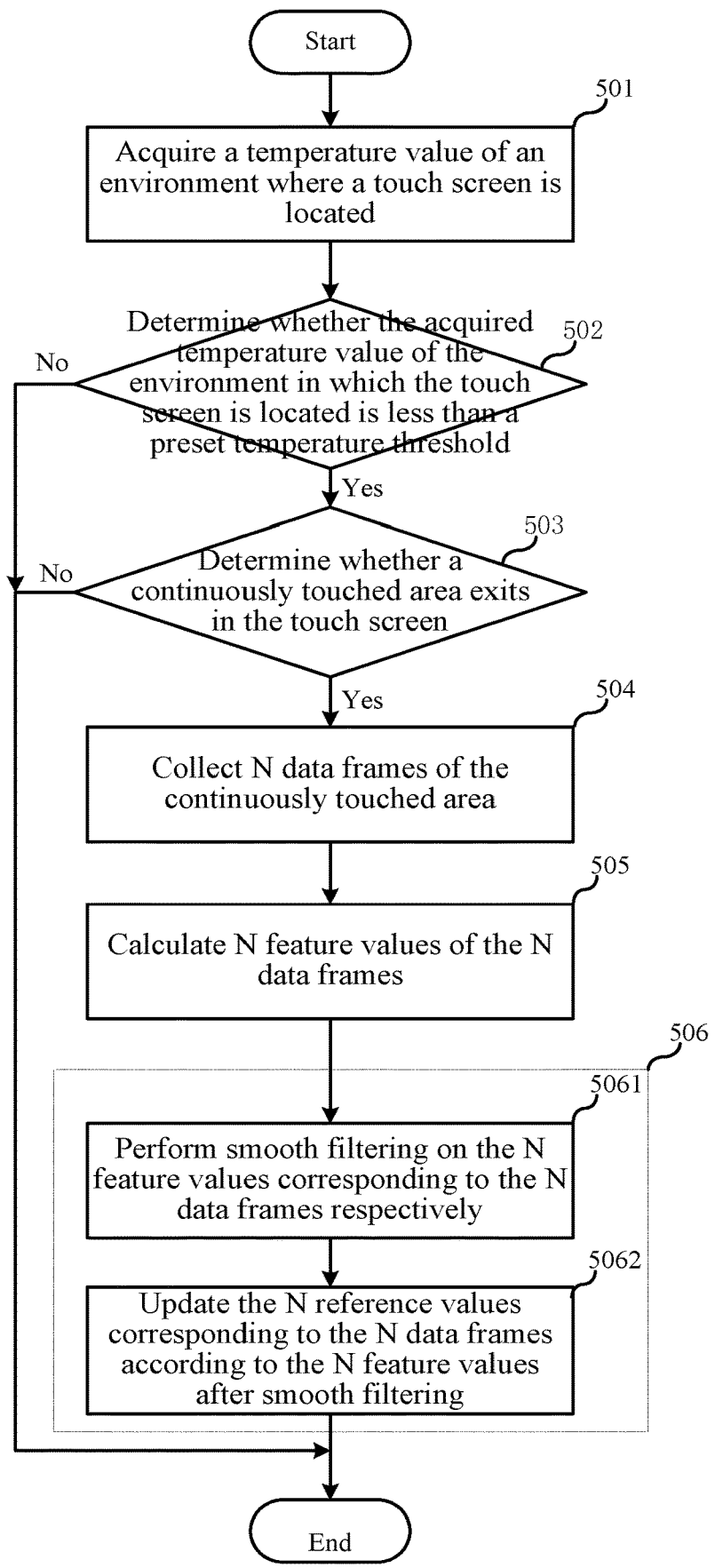
FIG. 10 is a specific flow chart of an update method for a reference value of a touch screen according to a fifth embodiment of the present application.

The update method for a reference value of a touch screen in the embodiment is as shown in FIG. 10.

Wherein step 501 to step 505 are substantially the same as step 101 to step 105, which will not be elaborated herein, and the main differences lie in that: in the embodiment, the step 506 of updating N reference values corresponding to the N data frames according to the N feature values specifically includes the following sub-steps.

In sub-step 5061, smooth filtering is performed on the N feature values corresponding to the N data frames respectively.

Figure 11:
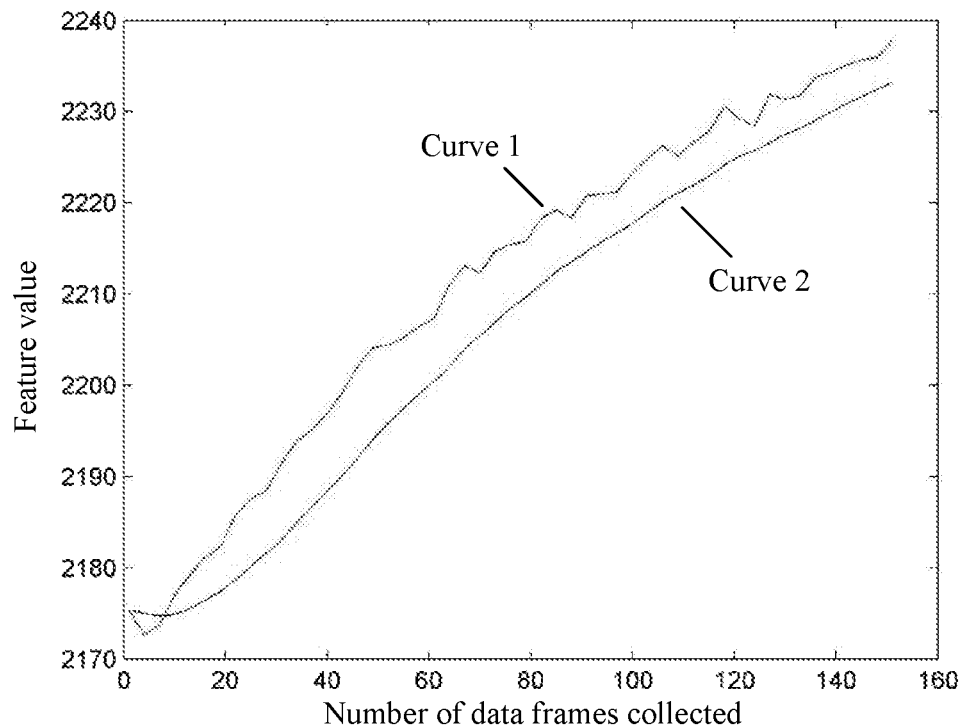
FIG. 11 is a graph showing changing of feature values before and after filtering according to the fifth embodiment of the present application.

Specifically, since the feature value of the touch screen will not only suffer the slow change caused by the temperature of the touch object, but also suffer the change caused by jitter of the touch object, thus it is necessary to filter out the change of the feature value caused by jitter. Since the change of the feature value caused by jitter is instantaneous, in the embodiment, a recursive filter is used to perform smooth filtering on the feature value in each of the data frames. Please refer to FIG. 11, in the figure, a curve 1 is a curve showing changing of feature values in the scope of the continuously touched area, and a curve 2 is a curve showing changing of feature values after being filtered. A calculation formula of the smoothing filtering is:

$$\text{FeatureData}(j+1)=\beta*\text{FeatureData}(j+1)+(1-\beta)\text{FeatureData}(j)$$

wherein, FeatureData denotes a feature value, $\beta$ denotes a smooth filtering empirical coefficient, and $j=M, M+1, M+2, \ldots, M+N-1$.

In sub-step 5062, the N reference values corresponding to the N data frames are updated according to the N feature values after smooth filtering.

Specifically, the reference value in the scope of the continuously touched area is locally updated according to a change trend of the feature value of each filtered data frame, the differential value of the feature values can be used to describe the change trend of the feature values, and all the reference values in the range of the continuously touched area are added with the differential value.

Relative to the first embodiment, the changes of the feature values caused by jitter are filtered, and the accuracy of updating the reference values is improved in the embodiment. It should be noted that the embodiment can also be used as a refinement based on the second embodiment to the fourth embodiment, which can achieve the same technical effects.

Figure 12:
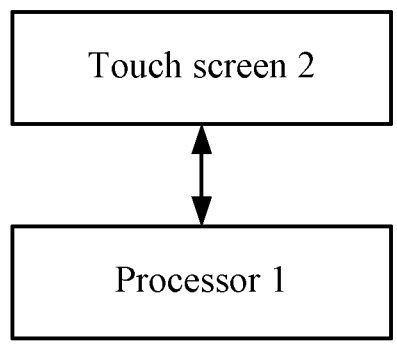
FIG. 12 is a block diagram of a touch detection circuit according to a sixth embodiment of the present application.

A sixth embodiment of the present application relates to a touch detection circuit. Please refer to FIG. 12, the touch detection circuit includes a processor 1.

In the embodiment, the processor 1 is connected to a touch screen 2, and the touch screen 2 can be applied to an electronic device. The processor 1 is configured to acquire a temperature value of an environment where the touch screen 2 is located through a temperature sensor in the electronic device.

The touch detection circuit may further include a driving circuit for generating a driving signal, a sensing circuit for detecting a sensing signal, and corresponding processing circuits for AD conversion, amplification, and mixing.

The processor 1 is configured to acquire the temperature value of the environment where the touch screen 2 is located; and the processor 1 is further configured to, when determining that the acquired temperature value is less than a preset temperature threshold and determining that a continuously touched exists in the touch screen 2, collect N data frames of the continuously touched area through the touch screen 2.

The processor 1 is further configured to calculate N feature values of the N data frames, and update N reference values corresponding to the N data frames according to the N feature values; wherein, N is greater than 1 and N is an integer.

The processor 1 takes acquired average or median of sensed values of each sensing node in the touch region of the touch screen 2 as the feature value, which is not limited thereto, and the original value of a certain sensing node may also be used as the feature value (the original value is acquired by performing coding sampling on a reference original value established before detecting a user operation on the touch screen 2 by a touch control chip); or the maximum or minimum values of the sensed values of all the sensing nodes in a certain touch area on the touch screen 2 are used as the feature values; or the maximum or minimum values of the sensed values of all the sensing nodes on the entire touch screen 2 are used as the feature values; wherein, taking the acquired average or median of the sensed values of each sensing node in the touch area of the touch screen 2 as the feature values has preferable stability than that of the other ways.

In the updating N reference values corresponding to the N data frames according to the N feature values by the processor of the embodiment, and a calculation formula is:

$$\begin{cases} Ref(M+i) = Ref(M+i-1), (K \in \{1,2,3\ldots\}, i \in \{1,2,3\ldots\} \text{ and } i \neq K*N) \\ Ref(M+i) = Ref(M+K*(N-1)) + \alpha*(FeatureData(M+K*N) - FeatureData(M+K*(N-1))), i = K*N \end{cases}$$

wherein, Ref denotes a reference value, FeatureData denotes a feature value, and α denotes a reference-updated empirical coefficient.

Since the first embodiment and the embodiment correspond to each other, the embodiment can be implemented cooperatively with the first embodiment. The technical details mentioned in the first embodiment are still effective in the embodiment, and the technical effects that can be achieved in the first embodiment can also be implemented in the embodiment. To reduce repetition, details will not be elaborated herein. Accordingly, related technical details mentioned in the embodiment can also be applied into the first embodiment.

Comparing the embodiment with the prior art, when the acquired temperature value of the environment where the touch screen is located is less than the preset temperature threshold, the N data frames of the continuously touched area are collected and the N feature values of the N data frames are used to update the corresponding N reference values thereof, so that the difference between the reference value and the sensed value of the continuously touched area is not decreased with a temperature rise due to the heat transferred by a touched object, thus the phenomenon of point elimination at a low temperature is avoided.

Figure 13:
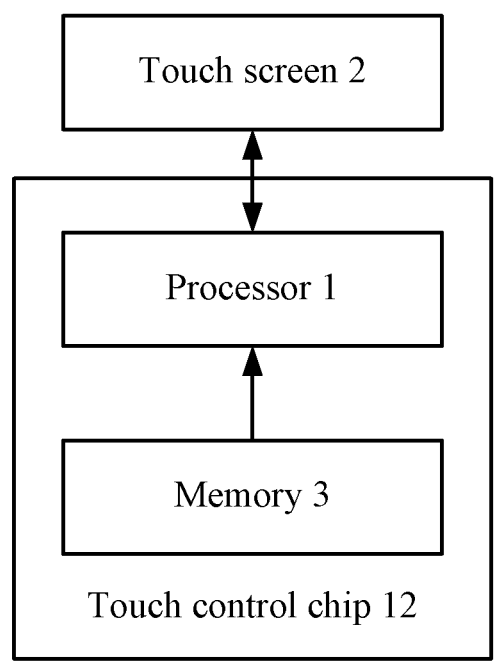
FIG. 13 is a block diagram of a touch detection circuit according to a seventh embodiment of the present application.

A seventh embodiment of the present application relates to a touch detection circuit. The embodiment is substantially the same as the sixth embodiment, and the main differences lie in that: please refer to FIG. 13, the touch detection circuit further includes a memory 3.

In the embodiment, the processor 3 is connected to the memory 3, and the processor 1 and the memory 3 can be integrated in one touch control chip 12.

The memory 3 is configured to store a preset correspondence between the feature value and the temperature value.

The processor 1 is configured to acquire original detection data collected in an untouched state in the environment where the touch screen 2 is located, calculate a feature value in the environment where the touch screen 2 is located according to the original detection data, and acquire a temperature value corresponding to the feature value according to the preset correspondence between the feature value and the temperature value. Wherein a specific acquiring manner is described in detail in the second embodiment, which will not be elaborated herein.

Since the second embodiment and the embodiment correspond to each other, the embodiment can be implemented cooperatively with the second embodiment. The technical details mentioned in the second embodiment are still effective in the embodiment, and the technical effects that can be achieved in the second embodiment can also be implemented in the embodiment. To reduce repetition, details will not be elaborated herein. Accordingly, related technical details mentioned in the embodiment can also be applied into the second embodiment.

Relative to the sixth embodiment, the embodiment provides another specific manner for acquiring a temperature value of the environment where the touch screen is located, which can acquire the temperature value without using a temperature sensor, requires less hardware, and has low requirements on the hardware configuration of the electronic device, so that the embodiment can be applied to more electronic devices.

An eighth embodiment of the present application relates to a touch detection circuit. The embodiment is a refinement to the sixth embodiment, and the main refinements lie in that: a method of determining whether a touch region exists in the touch screen 2 is described in detail.

The processor 1 is further configured to acquire M data frames of the touch screen 2 when a touch operation is detected; and identify sensing nodes in a touch state in each of the data frames according to sensed value of each sensing node in each of the M data frames; wherein, the M data frames are collected before the N data frames. The value of M can be obtained by experimental observation in a low temperature environment. Preferably, the value of M is 9, but the embodiment does not impose any limitation thereon.

The processor 1 is further configured to determine whether the sensing nodes in a touch state in two adjacent data frames of the M data frames are matched; when a determination result is that the sensing nodes are matched, the processor 1 determines that a continuously touched area exists, selects a data frame from the M data frames, and sets an area formed by the sensing nodes a touch state in the selected data frame as the continuously touched area.

Since the third embodiment and the embodiment correspond to each other, the embodiment can be implemented cooperatively with the third embodiment. The technical details mentioned in the third embodiment are still effective in the embodiment, and the technical effects that can be achieved in the third embodiment can also be implemented in the embodiment. To reduce repetition, details will not be elaborated herein. Accordingly, related technical details mentioned in the embodiment can also be applied into the third embodiment.

Relative to the sixth embodiment, the embodiment provides a specific method for determining whether a continuously touched area exists in the touch screen. It should be noted that the embodiment can also be used as a refinement to the seventh embodiment, which can achieve the same technical effects.

A ninth embodiment of the present application relates to a touch detection circuit. The embodiment is an improvement on the basis of the eighth embodiment, and the main improvements lie in that: in the embodiment, after the continuously touched area is determined, the continuously touched area is externally expanded according to a preset rule.

In the embodiment, the processor 1 is further configured to, after setting the continuously touched area, externally expand the continuously touched area according to a preset rule.

Since the fourth embodiment and the embodiment correspond to each other, the embodiment can be implemented cooperatively with the fourth embodiment. The technical details mentioned in the fourth embodiment are still effective in the embodiment, and the technical effects that can be achieved in the fourth embodiment can also be implemented in the embodiment. To reduce repetition, details will not be elaborated herein. Accordingly, related technical details mentioned in the embodiment can also be applied into the fourth embodiment.

Relative to the eighth embodiment, after the continuously touched area is determined in the embodiment, the continuously touched area is externally expanded according to a preset rule, so that the touch area is increased, thereby avoiding errors caused by slightly changing a touched position of a touched object.

A tenth embodiment of the present application relates to a touch detection circuit. The embodiment is a refinement to the sixth embodiment, and the main refinements lie in that: an update method for the N reference values corresponding to the N data frames according to the N feature values is introduced in detail.

In the embodiment, the processor 1 is configured to perform smooth filtering on the N feature values corresponding to the N data frames respectively, and update the N reference values corresponding to the N data frames according to the N feature values after smooth filtering.

In the embodiment, a calculation formula of the smoothing filtering is:

$$\text{FeatureData}(j+1)=\beta*\text{FeatureData}(j+1)+(1-\beta)\text{FeatureData}(j)$$

wherein, FeatureData denotes a feature value, $\beta$ denotes a smooth filtering empirical coefficient, and $j=M, M+1, M+2, \ldots, M+N-1$.

Since the fifth embodiment and the embodiment correspond to each other, the embodiment can be implemented cooperatively with the fifth embodiment. The technical details mentioned in the fifth embodiment are still effective in the embodiment, and the technical effects that can be achieved in the fifth embodiment can also be implemented in the embodiment. To reduce repetition, details will not be elaborated herein. Accordingly, related technical details mentioned in the embodiment can also be applied into the fifth embodiment.

Relative to the sixth embodiment, the changes of the feature values caused by jitter are filtered, and the accuracy of updating the reference values is improved in the embodiment. It should be noted that the embodiment can also be used as a refinement based on the seventh embodiment to the ninth embodiment, which can achieve the same technical effects.

An eleventh embodiment of the present application relates to an electronic device such as a mobile phone, a tablet personal computer, or the like. In the present embodiment, the electronic device includes the touch detection circuit according to any one of the sixth embodiment to the ninth embodiment.

Relative to the prior art, the embodiment provides an electronic device using the touch detection circuit above.

Those of ordinary skill in the art can understand that all the above embodiments are specific embodiments for implementing the application, and in practical applications, various changes in form and detail can be made without departing from the spirit and scope of the application.

What is claimed is:

1. An update method for a reference value of a touch screen, comprising:
    acquiring a temperature value of an environment where the touch screen is located;
    when determining that the acquired temperature value is less than a preset temperature threshold and determining that a continuously touched area exists in the touch screen, collecting N data frames of the continuously touched area, wherein each of the N data frames comprises one or more capacitance values sensed by sensing nodes at the continuously touched area;
    calculating N feature values of the N data frames, wherein the N feature values include one of the following: an average or median value of sensed capacitance values of all touch sensing nodes in the continuously touched area, a sensed capacitance value of a certain touch sensing node in the continuously touched area, a maximum or minimum value of the sensed capacitance values of all touch sensing nodes in the continuously touched area, a maximum or minimum value of the sensed capacitance values of all touch sensing nodes in the entire touch screen; and
    updating N reference values corresponding to the N data frames according to the N feature values;
    wherein N is greater than 1 and N is an integer, and each of the N reference values is a base value for calculating a capacitance change at the continuously touched area; and
    wherein the determining that a continuously touched area exists in the touch screen comprises:
        when a touch operation is detected, collecting M data frames of the touch screen;
        wherein, the M data frames are collected before the N data frames;
        identifying sensing nodes in a touch state in each of the data frames according to a sensed value of each sensing node in each of the M data frames;
        determining whether the sensing nodes in a touch state in two adjacent data frames of the M data frames are matched; wherein when the two adjacent data frames contain a half or more of the same sensing nodes, a determination result is that the sensing nodes are matched;
        when a determination result is that the sensing nodes are matched, determining that a continuously touched area exists; and
        selecting a data frame from the M data frames, and setting an area of the touch screen formed by the sensing nodes in a touch state in the selected data frame as the continuously touched area.

2. The update method according to claim 1, wherein, after setting an area of the touch screen formed by the sensing nodes in a touch state in the selected data frame as the continuously touched area, the method further comprises:
    externally expanding the continuously touched area according to a preset rule.

3. The update method according to claim 1, wherein, in the updating N reference values corresponding to the N data frames according to the N feature values, a calculation formula is employed:

$$\begin{cases} Ref(M+i) = Ref(M+i-1), (K \in \{1, 2, 3 \ldots\}, i \in \{1, 2, 3 \ldots\} \text{ and } i \neq K*N) \\ Ref(M+i) = Ref(M+K*(N-1)) + \alpha*(FeatureData(M+K*N) - FeatureData(M+K*(N-1))), i = K*N \end{cases}$$

wherein, Ref denotes a reference value, FeatureData denotes a feature value, and α denotes a reference-updated empirical coefficient.

4. The update method according to claim 1, wherein the updating N reference values corresponding to the N data frames according to the N feature values comprises:
   performing smooth filtering on the N feature values corresponding to the N data frames respectively; and
   updating the N reference values corresponding to the N data frames according to the N feature values after smooth filtering.

5. The update method according to claim 4, wherein a calculation formula of the smoothing filtering is:

FeatureData($j$+1)=β*FeatureData($j$+1)+(1−β)Feature-Data($j$)

wherein, FeatureData denotes a feature value, β denotes a smooth filtering empirical coefficient, and j=M, M+1, M+2 . . . , M+N−1.

6. The update method according to claim 1, wherein the touch screen is applied to an electronic device; and a manner for acquiring the temperature value of an environment where the touch screen is located particularly comprises:
   acquiring the temperature value by a temperature sensor disposed in the electronic device.

7. The update method according to claim 1, wherein a manner for acquiring the temperature value of an environment where the touch screen is located particularly comprises:
   acquiring original detection data collected in an untouched state in the environment where the touch screen is located;
   calculating a feature value of the environment where the touch screen is located according to the original detection data; and
   acquiring a temperature value corresponding to the feature value according to a preset correspondence between the feature value and the temperature value.

8. The update method according to claim 1, wherein the calculating N feature values of the N data frames comprises:
   calculating average or median of the sensed values of each sensing node in the N data frames as the N feature value.

9. A touch detection circuit, at least comprising a processor, wherein the processor is connected to a touch screen; the processor is configured to:
   acquire a temperature value of an environment where the touch screen is located;
   when determining that the acquired temperature value is less than a preset temperature threshold and determining that a continuously touched exists in the touch screen, collect N data frames of the continuously touched area through the touch screen, wherein each of the N data frames comprises one or more capacitance values sensed by sensing nodes at the continuously touched area;
   calculate N feature values of the N data frames, wherein the N feature values include one of the following: an average or median value of sensed capacitance values of all touch sensing nodes in the continuously touched area, a sensed capacitance value of a certain touch sensing node in the continuously touched area, a maximum or minimum value of the sensed capacitance values of all touch sensing nodes in the continuously touched area, a maximum or minimum value of the sensed capacitance values of all touch sensing nodes in the entire touch screen; and
   update N reference values corresponding to the N data frames according to the N feature values;
   wherein N is greater than 1 and N is an integer, and each of the N reference values is a base value for calculating a capacitance change at the continuously touched area; and
   wherein the determining that a continuously touched area exists in the touch screen comprises:
     when a touch operation is detected, acquire M data frames of the touch screen;
     identify sensing nodes in a touch state in each of the data frames according to sensed value of each sensing node in each of the M data frames;
   wherein, the M data frames are collected before the N data frames;
     determining whether the sensing nodes in a touch state in two adjacent data frames of the M data frames are matched; wherein when the two adjacent data frames contain a half or more of the same sensing nodes, a determination result is that the sensing nodes are matched;
     when a determination result is that the sensing nodes are matched, determining that a continuously touched area exists; and
     selecting a data frame from the M data frames, and sets an area of the touch screen formed by the sensing nodes in a touch state in the selected data frame as the continuously touched area.

10. The touch detection circuit according to claim 9, wherein the processor is further configured to externally expand the continuous touch area according to a preset rule after the continuously touched area is set.

11. The touch detection circuit according to claim 9, wherein, in the updating N reference values corresponding to the N data frames according to the N feature values by the processor, a calculation formula is employed:

$$\begin{cases} Ref(M+i) = Ref(M+i-1), (K \in \{1, 2, 3 \ldots\}, i \in \{1, 2, 3 \ldots\} \text{ and } i \neq K*N) \\ Ref(M+i) = Ref(M+K*(N-1)) + \alpha*(FeatureData(M+K*N) - FeatureData(M+K*(N-1))), i = K*N \end{cases}$$

wherein, Ref denotes a reference value, FeatureData denotes a feature value, and α denotes a reference-updated empirical coefficient.

12. The touch detection circuit according to claim 9, wherein the processor is configured to perform smooth filtering on the N feature values corresponding to the N data frames respectively, and update the N reference values corresponding to the N data frames according to the N feature values after smooth filtering.

13. The touch detection circuit according to claim 12, wherein a calculation formula of the smoothing filtering is:

FeatureData($j$+1)=$\beta$*FeatureData($j$+1)+(1−$\beta$)FeatureData($j$)

wherein, FeatureData denotes a feature value, $\beta$ denotes a smooth filtering empirical coefficient, and j=M, M+1, M+2, . . . , M+N−1.

14. The touch detection circuit according to claim 9, wherein the touch screen is applied to an electronic device; and
the processor is configured to acquire the temperature value of the environment where the touch screen is located by a temperature sensor disposed in the electronic device.

15. The touch detection circuit according to claim 9, wherein the touch detection circuit further comprises a memory connected to the processor;
the memory is configured to store a preset correspondence between the feature value and the temperature value; and
the processor is configured to acquire original detection data collected in an untouched state in the environment where the touch screen is located, calculate a feature value in the environment where the touch screen is located according to the original detection data, and acquire a temperature value corresponding to the feature value according to the preset correspondence between the feature value and the temperature value.

16. The touch detection circuit according to claim 9, wherein the processor is configured to calculate averages or medians of the sensed values of the sensing nodes in the N data frames as the N feature values.

17. An electronic device, comprising a touch detection circuit, wherein the touch detection circuit at least comprises a processor, the processor is connected to a touch screen;
the processor is configured to:
acquire a temperature value of an environment where the touch screen is located;
when determining that the acquired temperature value is less than a preset temperature threshold and determining that a continuously touched exists in the touch screen, collect N data frames of the continuously touched area through the touch screen, wherein each of the N data frames comprises one or more capacitance values sensed by sensing nodes at the continuously touched area;
calculate N feature values of the N data frames, wherein the N feature values include one of the following: an average or median value of sensed capacitance values of all touch sensing nodes in the continuously touched area, a sensed capacitance value of a certain touch sensing node in the continuously touched area, a maximum or minimum value of the sensed capacitance values of all touch sensing nodes in the continuously touched area, a maximum or minimum value of the sensed capacitance values of all touch sensing nodes in the entire touch screen; and
update N reference values corresponding to the N data frames according to the N feature values;
wherein N is greater than 1 and N is an integer, and each of the N reference values is a base value for calculating a capacitance change at the continuously touched area; and
wherein the determining that a continuously touched area exists in the touch screen comprises:
when a touch operation is detected, collecting M data frames of the touch screen; wherein, the M data frames are collected before the N data frames;
identifying sensing nodes in a touch state in each of the data frames according to a sensed value of each sensing node in each of the M data frames;
determining whether the sensing nodes in a touch state in two adjacent data frames of the M data frames are matched; wherein when the two adjacent data frames contain a half or more of the same sensing nodes, a determination result is that the sensing nodes are matched;
when a determination result is that the sensing nodes are matched, determining that a continuously touched area exists; and
selecting a data frame from the M data frames, and setting an area of the touch screen formed by the sensing nodes in a touch state in the selected data frame as the continuously touched area.

* * * * *